Patented Oct. 6, 1942

2,297,921

UNITED STATES PATENT OFFICE 2,297,921

CYCLIC ACETALS

Murray Senkus, Terre Haute, Ind., assignor to Commercial Solvents Corporation, Terre Haute, Ind., a corporation of Maryland No Drawing. Application April 26, 1940, Serial No. 331,769

9 Claims. (Cl. 260—338)

My invention relates to new and useful cyclic acetals. More particularly, it concerns cyclic acetals having the general formula:

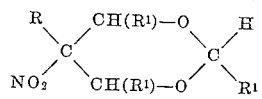

in which R may represent hydrogen, alpha-hydroxyalkyl or an alkyl group, and $R^1$ may be alkyl, aryl, furyl, or hydrogen. As examples of such compounds which may be included by the above generic formula are the 5-nitro-1,3-dioxanes, the 2-phenyl-5-nitro-1,3-dioxanes, and the 2-propyl-5-nitro-1,3-dioxanes which have the following structural formulas:

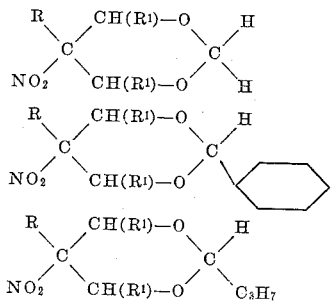

These compounds may in general be conveniently prepared by distilling a mixture consisting of a polyhydroxy nitro compound and the desired aldehyde in the presence of a small amount of a mineral acid catalyst such as concentrated hydrochloric or sulfuric acids. In certain instances it is desirable to employ a molecular excess of the aldehyde. Likewise it is frequently desirable to add to the reaction mixture a liquid such as benzene or toluene which is capable of removing the water produced, during the formation of the cyclic acetals, as a constant boiling mixture with said liquid.

The compounds produced in this manner may be obtained in a relatively pure state by washing the crude reaction mixture with a suitable quantity of water. If necessary, a dilute solution of a weak alkaline material, such as sodium bicarbonate, may be first employed to neutralize the acid catalyst present, followed by washing with water to remove any additional impurities. The liquid cyclic acetals produced in such instances are preferably dried over a solid dehydrating agent such as calcium chloride or anhydrous calcium sulfate and then distilled. However, these compounds may also be satisfactorily dehydrated by distilling the same with benzene or similar organic liquids. The cyclic acetals which are solids at room temperature, are separated from the reaction mixture by filtration or any other satisfactory means, after which said acetals may be conveniently purified at temperatures slightly above their melting point by washing, if desired, with a dilute sodium bicarbonate solution, followed by treatment with water. Upon cooling, the solid product thus obtained may be further freed from impurities by recrystallizing from a solvent, such as methyl alcohol, ether, benzene, and the like. Colored impurities, in either the liquid or solid products, may be effectively removed by means of heating said products in the presence of a small amount of decolorizing carbons, or similar materials.

The polyhydroxy nitro compounds employed in carrying out my invention may be prepared by any suitable means. I prefer in general, however, to prepare such compounds in accordance with the procedure described in United States Patent No. 2,139,120 by H. B. Hass and B. M. Vanderbilt. According to this procedure, polyhydroxy nitro compounds of the class employed in my invention may be conveniently prepared by slowly adding two moles of the desired aldehyde with thorough agitation, to one mole of a primary nitroparaffin in the presence of a small amount of hydrated lime, the temperature being preferably maintained between 30° C. and 35° C.

Polyhydroxy nitro compounds which may be employed in my invention and prepared in accordance with the procedure referred to above, may be any of such compounds which are capable of forming cyclic acetals under the described conditions, and it is to be understood that the expression "polyhydroxy nitro compound" is to be interpreted as such. More specifically, these compounds may be represented by the following general formula:

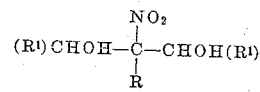

in which $R^1$ may represent hydrogen, alkyl, aryl, or furyl, and R may represent hydrogen, alkyl, or alpha-hydroxy-alkyl. Specific examples of polyhydroxy nitro compounds included by the above generic formula are: tris-(hydroxy-methyl)-nitromethane, 2-methyl-2-nitro-1,3-propanediol, 2-ethyl-2-nitro-1,3-propanediol, 2-propyl-2-nitro-1,3-propanediol, 2-isopropyl-2-nitro-1,3-propanediol, 2-nitro-2-isobutyl-1,3-propanediol, 2,8-dimethyl-5-nitro-4,6-nonanediol, 1,3-diphenyl-2- nitro-1,3-propanediol, 2-nitro-1,3-difuryl-1,3-propanediol, and the like.

The aldehydes which may be utilized in the preparation of the cyclic acetals of my invention may be represented by the general formula:

RCHO in which R may represent hydrogen, alkyl, furyl, aryl, and the like. As examples of specific aldehydes which are included by the above formula, there may be mentioned formaldehyde, acetaldehyde, butyraldehyde, heptaldehyde, 2-ethylhexanal, benzaldehyde, furfuraldehyde, and the like.

The following examples describe certain of the new cyclic acetals and methods for their preparation; however, they are not to be construed as limiting my invention since I have found that the reaction between aldehydes and polyhydroxy nitro compounds of the types described above is general and may be readily effected.

Example I 2-propyl-5-hydroxymethyl-5-nitro-1,3-dioxane was prepared by distilling a mixture consisting of 302 parts of tris-(hydroxymethyl)-nitromethane, 325 parts of butyraldehyde and 1.5 parts of hydrochloric acid. When approximately 237 parts of distillate had been recovered, the heating was discontinued, the still residue cooled and washed with 200 parts of cold water. The crude 2-propyl-5-hydroxymethyl-5-nitro-1,3-dioxane solidified and the wash water, containing hydrochloric acid and unreacted starting materials, was separated therefrom by means of filtration. The product obtained in this manner was then recrystallized twice from methanol, giving a colorless, odorless material melting at 70° C. (uncorrected).

Analysis: Calculated for $C_8H_{13}NO_5$: N, 6.83, found: N, 6.89.

Example II

A mixture of 135 parts of 2-methyl-2-nitro-1,3-propanediol, 110 parts of benzaldehyde, 275 parts of toluene and 1.5 parts of concentrated hydrochloric acid was heated gently until all of the toluene, together with the water produced by the formation of the acetal, had been completely distilled off. The reaction mixture was then treated with 200 parts of cold water as described in Example I, after which the crude 2-phenyl-5-methyl-5-nitro-1,3-dioxane was heated with decolorizing charcoal and filtered. This product, which solidified on cooling, was further purified by recrystallization from benzene. The compound obtained in this manner melted at 111.5° C., and amounted to 210 parts, corresponding to a yield of 92%.

Analysis: Calculated for $C_{11}H_{13}NO_4$: N, 6.22, found: N, 6.29.

Example III 2-(3-heptyl)-3-methyl-5-nitro-1,3-dioxane was prepared by gently heating a mixture consisting of 130 parts 2-methyl-2-nitro-1,3-propanediol, 130 parts of 2-ethyl-hexanal, 275 parts of toluene, and 1 part of concentrated hydrochloric acid. Heating was continued until substantially all of the water produced during the acetal formation was removed, together with the toluene, in the form of a constant boiling mixture. The residue thus obtained was first washed with 200 parts of a 10% sodium bicarbonate solution and then with 100 parts of water, after which it was distilled at 123–125° C. (2 mm.). The refined product amounted to 181 parts, corresponding to a yield of 74%.

Analysis: Calculated for $C_{12}H_{24}NO_4$: N, 5.71, found: N, 5.74.

Example IV

A mixture consisting of 150 parts of 2-methyl-2-nitro-1,3-propanediol, 78 parts of formaldehyde in the form of a 40% aqueous solution, and 1.5 parts of concentrated hydrochloric acid was slowly distilled until approximately 180 parts of distillate had been recovered. The still residue was shaken with 200 parts of a 10% sodium bicarbonate solution, washed twice with 50 parts of water and then dried over calcium chloride. This product, 5-methyl-5-nitro-1,3-dioxane, which was a thick viscous syrup, was further purified by distilling with steam, giving a solid and substantially colorless material. Recrystallization from water yielded a white, odorless, crystalline compound melting at 69° C. (uncorrected).

Analysis: Calculated for $C_5H_9NO_4$: N, 9.52, found: N, 9.40.

Cyclic acetals prepared as outlined above, are either colorless liquids or white crystalline solids and are soluble in the common organic solvents such as methanol, acetone, ether and benzene. Certain of these compounds have further been found to be heat stable, discoloring only slightly when subjected to temperatures as high as 200° C. at atmospheric pressure.

The cyclic acetals of my invention have been found to constitute satisfactory ingredients in various coating compositions. Such compounds are similarly useful as reagents in the synthesis of numerous valuable organic compounds. Other uses for such products will readily occur to those skilled in the art.

My invention now having been described, what I claim is:

1. Cyclic acetals having the following formula:

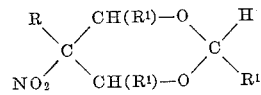

wherein R is a member of the group consisting of hydrogen, alkyl, and alpha-hydroxyalkyl, and $R^1$ is a member of the group consisting of hydrogen, alkyl, aryl, and furyl.

2. Cyclic acetals having the structural formula:

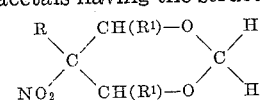

in which R is a member of the group consisting of hydrogen, alkyl, and alpha-hydroxyalkyl, and $R^1$ is a member of the group consisting of hydrogen, alkyl, aryl, and furyl.

3. Cyclic acetals of polyhydroxy nitro compounds of the formula:

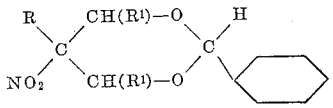

wherein R is a member of the group consisting of hydrogen, alkyl, and alpha-hydroxyalkyl, $R^1$ is a member of the group consisting of hydrogen, alkyl, aryl, and furyl.

4. Cyclic acetals having the formula:

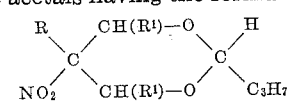

in which R is a member of the group consisting of hydrogen, alkyl and alpha-hydroxyalkyl, and $R^1$ is a member of the group consisting of hydrogen, alkyl, aryl, and furyl.

5. 2-propyl-5-hydroxymethyl-5-nitro-1,3-dioxane.
6. 5-methyl-5-nitro-1,3-dioxane.
7. 2-phenyl-5-methyl-5-nitro-1,3-dioxane.
8. In a process for the preparation of cyclic acetals, the step which comprises reacting a polyhydroxy nitro compound with an aldehyde in the presence of a mineral acid, wherein the acid is present in a concentration of about one gram per mole of polyhydroxy nitro compound, said aldehyde having the formula:

RCHO wherein R is a member of the group consisting of hydrogen, alkyl, aryl, and furyl.

9. In a process for the production of cyclic acetals, the step which comprises reacting an aldehyde with a polyhydroxy nitro compound in the presence of a mineral acid, wherein the acid is present in a concentration of about one gram per mole of polyhydroxy nitro compound, said polyhydroxy nitro compound having the formula:

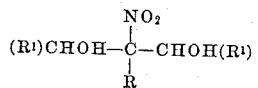

in which $R^1$ is a member of the group consisting of hydrogen, alkyl, aryl, and furyl, and R is a member of the group consisting of hydrogen, alkyl, and alpha-hydroxy alkyl, said aldehyde having the general formula:

RCHO in which R is a member of the group consisting of hydrogen, alkyl, aryl, and furyl.

MURRAY SENKUS.